US008002985B1

(12) United States Patent
Wanielista et al.

(10) Patent No.: US 8,002,985 B1
(45) Date of Patent: Aug. 23, 2011

(54) PASSIVE NUTRIENT REMOVAL MATERIAL MIXES

(75) Inventors: Martin P. Wanielista, Winter Park, FL (US); Ni-Bin Chang, Winter Springs, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 12/726,903

(22) Filed: Mar. 18, 2010

Related U.S. Application Data

(62) Division of application No. 12/462,622, filed on Aug. 6, 2009, now Pat. No. 7,824,551, which is a division of application No. 12/200,140, filed on Aug. 28, 2008, now Pat. No. 7,897,047.

(60) Provisional application No. 60/967,259, filed on Aug. 31, 2007.

(51) Int. Cl.
*C02F 3/32* (2006.01)
(52) U.S. Cl. .......................................... 210/602; 47/902
(58) Field of Classification Search .................. 210/602; 47/1.01 R, 902
See application file for complete search history.

(56) References Cited

U.S. PATENT DOCUMENTS

| 3,710,510 | A | * | 1/1973 | Tully et al. | 47/58.1 R |
| 3,820,280 | A | * | 6/1974 | Gilgen | 47/79 |
| 5,014,462 | A | * | 5/1991 | Malmgren et al. | 47/1.01 R |

* cited by examiner

*Primary Examiner* — Fred Prince
(74) *Attorney, Agent, or Firm* — Brian S. Steinberger; Phyllis K. Wood; Law Offices of Brian S. Steinberger, P.A.

(57) ABSTRACT

Materials, compositions, substances and methods and systems for stormwater treatment in wet ponds, dry ponds and a green roof system. A first embodiment provides in-situ treatment unit within the retention pond by withdrawing the stored stormwater to circulate the stored stormwater into the in-situ treatment unit to sorb nitrogen from the stored stormwater. A second embodiment provides uses a riprap apron, a perforated riser located at the bottom of the riprap apron and a goetextile media encased in a sorption media jacket around the perforated riser. A third embodiment provides a green roof stormwater treatment system that includes protection for waterproofing and insulating the roof, a pollution control media layer for filtration and sorption of solids and dissolved materials found in stormwater, a growing media for growing vegetation, and a cistern to store the runoff stormwater between irrigation events. The green roof system includes recycling runoff stormwater by irrigating the green roof with the stored stormwater.

13 Claims, 15 Drawing Sheets

Table 6

ET Monthly Average Comparison of test Chambers [in/day]

| Date | TVO1 | TVO2 | TVR1 | TVR2 | TO1 | TO2 | C1 | C2 | TR1 | TR2 | EO1 | EO2 | ER1 | ER2 | EVO1 | EVO2 | EVR1 | EVR2 |
|------|------|------|------|------|-----|-----|-----|-----|-----|-----|-----|-----|-----|-----|------|------|------|------|
| Jul  | 0.26 | 0.25 | 0.24 | 0.24 | 0.22 | 0.21 | 0.02 | 0.00 | 0.14 | 0.13 | 0.14 | 0.15 | 0.14 | 0.13 | 0.17 | 0.17 | 0.17 | 0.16 |
| Aug  | 0.20 | 0.22 | 0.17 | 0.18 | 0.17 | 0.17 | 0.00 | 0.02 | 0.16 | 0.15 | 0.15 | 0.14 | 0.14 | 0.14 | 0.14 | 0.14 | 0.14 | 0.14 |
| Sep  | 0.18 | 0.22 | 0.16 | 0.17 | 0.14 | 0.14 | 0.00 | 0.00 | 0.12 | 0.13 | 0.10 | 0.10 | 0.09 | 0.09 | 0.17 | 0.15 | 0.14 | 0.13 |
| Oct  | 0.11 | 0.14 | 0.10 | 0.10 | 0.09 | 0.10 | 0.00 | 0.01 | 0.09 | 0.09 | 0.07 | 0.08 | 0.07 | 0.08 | 0.11 | 0.13 | 0.10 | 0.09 |
| Nov  | 0.10 | 0.10 | 0.08 | 0.09 | 0.09 | 0.09 | 0.00 | 0.00 | 0.07 | 0.08 | 0.07 | 0.08 | 0.08 | 0.07 | 0.11 | 0.11 | 0.09 | 0.09 |
| Dec  | 0.09 | 0.09 | 0.08 | 0.09 | 0.09 | 0.08 | 0.00 | 0.00 | 0.07 | 0.08 | 0.08 | 0.08 | 0.07 | 0.07 | 0.09 | 0.09 | 0.08 | 0.08 |
| Jan  | 0.10 | 0.09 | 0.08 | 0.09 | 0.09 | 0.09 | 0.00 | 0.01 | 0.09 | 0.08 | 0.08 | 0.08 | 0.08 | 0.08 | 0.11 | 0.10 | 0.09 | 0.10 |
| Feb  | 0.11 | 0.10 | 0.08 | 0.12 | 0.11 | 0.12 | 0.00 | 0.00 | 0.09 | 0.10 | 0.09 | 0.09 | 0.09 | 0.09 | 0.12 | 0.10 | 0.10 | 0.10 |
| Mar  | 0.13 | 0.14 | 0.12 | 0.13 | 0.15 | 0.15 | 0.00 | 0.00 | 0.11 | 0.12 | 0.11 | 0.11 | 0.11 | 0.11 | 0.14 | 0.13 | 0.12 | 0.12 |
| Apr  | 0.17 | 0.19 | 0.13 | 0.16 | 0.16 | 0.17 | 0.00 | 0.00 | 0.13 | 0.13 | 0.12 | 0.12 | 0.12 | 0.12 | 0.17 | 0.16 | 0.15 | 0.14 |
| May  | 0.16 | .018 | 0.14 | 0.15 | 0.13 | 0.14 | 0.00 | 0.02 | 0.11 | 0.12 | 0.11 | 0.12 | 0.10 | 0.10 | 0.16 | 0.15 | 0.13 | 0.13 |
| Jun  | 0.20 | 0.20 | 0.18 | 0.19 | 0.17 | 0.18 | 0.00 | 0.03 | 0.16 | 0.15 | 0.16 | 0.16 | 0.14 | 0.14 | 0.17 | 0.18 | 0.17 | 0.17 |

Fig. 8

Table 7

F Factor Monthly Average Comparison of test Chambers

| Date | TVO1 | TVO2 | TVR1 | TVR2 | TO1 | TO2 | C1 | C2 | TR1 | TR2 | EP1 | EP2 | ER1 | ER2 | EVO1 | EVO2 | EVR1 | EVR2 |
|------|------|------|------|------|-----|-----|-----|-----|-----|-----|-----|-----|-----|-----|------|------|------|------|
| Jul  | 0.54 | 0.53 | 0.42 | 0.38 | 0.61 | 0.61 | 0.96 | 0.91 | 0.50 | 0.50 | 0.70 | 0.67 | 0.50 | 0.53 | 0.64 | 0.65 | 0.52 | 0.56 |
| Aug  | 0.46 | 0.41 | 0.24 | 0.21 | 0.52 | 0.51 | 0.94 | 0.88 | 0.35 | 0.27 | 0.67 | 0.65 | 0.39 | 0.40 | 0.62 | 0.62 | 0.39 | 0.40 |
| Sep  | 0.58 | 0.50 | 0.44 | 0.41 | 0.69 | 0.68 | 0.98 | 1.01 | 0.50 | 0.55 | 0.70 | 0.68 | 0.56 | 0.56 | 0.63 | 0.68 | 0.52 | 0.55 |
| Oct  | 0.71 | 0.68 | 0.60 | 0.55 | 0.75 | 0.74 | 0.97 | 0.94 | 0.60 | 0.61 | 0.81 | 0.79 | 0.67 | 0.64 | 0.71 | 0.71 | 0.55 | 0.59 |
| Nov  | 0.67 | 0.65 | 0.46 | 0.40 | 0.70 | 0.69 | 0.94 | 0.78 | 0.49 | 0.45 | 0.76 | 0.74 | 0.51 | 0.52 | 0.62 | 0.63 | 0.40 | 0.38 |
| Dec  | 0.74 | 0.72 | 0.59 | 0.54 | 0.74 | 0.75 | 0.98 | 0.82 | 0.61 | 0.57 | 0.77 | 0.77 | 0.61 | 0.61 | 0.73 | 0.73 | 0.58 | 0.57 |
| Jan  | 0.70 | 0.70 | 0.49 | 0.49 | 0.72 | 0.72 | 0.86 | 0.71 | 0.47 | 0.49 | 0.75 | 0.73 | 0.52 | 0.51 | 0.65 | 0.67 | 0.45 | 0.42 |
| Feb  | 0.65 | 0.68 | 0.51 | 0.42 | 0.68 | 0.67 | 0.98 | 0.87 | 0.46 | 0.45 | 0.72 | 0.70 | 0.48 | 0.49 | 0.62 | 0.67 | 0.45 | 0.44 |
| Mar  | 0.54 | 0.51 | 0.19 | 0.15 | 0.49 | 0.48 | -    | -    | 0.24 | 0.21 | 0.62 | 0.60 | 0.25 | 0.26 | 0.54 | 0.54 | 0.19 | 0.17 |
| Apr  | 0.47 | 0.41 | 0.25 | 0.10 | 0.50 | 0.46 | 0.97 | 0.83 | 0.26 | 0.21 | 0.62 | 0.60 | 0.28 | 0.28 | 0.49 | 0.50 | 0.14 | 0.16 |
| May  | 0.50 | 0.45 | .026 | 0.20 | 0.58 | 0.57 | 0.99 | 0.81 | 0.37 | 0.36 | 0.66 | 0.64 | 0.41 | 0.43 | 0.52 | 0.54 | 0.27 | 0.30 |
| Jun  | 0.56 | 0.57 | 0.42 | 0.37 | 0.62 | 0.62 | 0.99 | 0.84 | 0.48 | 0.52 | 0.65 | 0.65 | 0.55 | 0.56 | 0.62 | 0.61 | 0.44 | 0.47 |

Fig. 9

PASSIVE NUTRIENT REMOVAL MATERIAL MIXES

This application is a divisional application of U.S. patent application Ser. No. 12/462,622 filed on Aug. 6, 2009 now U.S. Pat. No. 7,824,551, which is a divisional application of U.S. patent application Ser. No. 12/200,140 filed on Aug. 28, 2008 now U.S. Pat. No. 7,897,047 which claims the benefit of priority to U.S. Provisional Application No. 60/967,259 filed on Aug. 31, 2007.

FIELD OF THE INVENTION

This invention relates to stormwater treatment and, in particular, to materials, compositions, substances and methods and systems for stormwater treatment using sorption and filter media for the control of nutrients and removal of phosphorus and nitrogen from stormwater using physical, chemical and biological processes for removing particulates and dissolved materials found in stormwater that are harmful to the environment.

BACKGROUND AND PRIOR ART

Nitrate concentrations have increased in many Upper Floridian aquifer springs since the 1950s, exceeding 1 mg/L in recent years at some springs. The Upper Floridian aquifer is particularly vulnerable to impacts from anthropogenic activities in areas where the aquifer is not confined or only thinly confined, such as throughout much of Marion County, north-central Florida. Phelps (2004) reported that nitrate concentrations ranged from less than 0.02 to 12 mg/L, with a median of 1.2 mg/L, for 56 Upper Floridian aquifer wells sampled in Marion County during 2000-2001.

Stormwater runoff is one of the possible sources of nitrate, among others such as septic tanks, land-based application of reclaimed stormwater, or fertilizer, which can contribute to elevated nitrate concentrations in the Upper Floridian aquifer. As a Statewide unified rule for stormwater is developed, there is a need to quantify the effects of stormwater retention/detention ponds on the underlying aquifers. In general little research is available for a quantitative process-based understanding of the effects of sorption media that can be used in the field for nutrient removal.

As of March 2007, there were approximately 1250 water body segments on the State of Florida impaired water bodies list Florida Department of Environmental Protection, 2007. Of these waters, there are about 60% classified as either lakes or streams. About 45% of the lakes and streams are impaired as measured by nutrients. The Florida Department of Environmental Protection also published a comprehensive integrated assessment of water quality (Florida Department of Environmental Protection, 2006). This publication noted that for many of the springs in the State, the nitrate level increased by two to three times over the past 20 years. It is also known that nitrate concentrations have increased in many Floridian aquifer springs since the 1950s, exceeding 1 mg/L in recent years at some springs. The use of differing sorption media in wet and dry ponds turns out to be an appealing engineering approach in dealing with the increasing trend of higher nitrate concentrations that is expected to continue in the surface and groundwater systems.

The control of stormwater runoff is a pressing issue facing most urban areas where land availability for stormwater ponds is either not physically available or other stormwater options are very expensive. Stormwater runoff into separate or combined sewers can be polluted in several ways such as contact with corroded and deposited roof materials and contact with fecal matter, fertilizers and pesticides from lawns and agricultural land. One possible solution for treatment of roof runoff stormwater is the use of a green roof stormwater treatment and reuse system, which includes a cistern or holding pond from which stormwater is returned to the green roof, and less stormwater is discharged to receiving waters.

The most practical approach to the problem of stormwater runoff is to treat the stormwater as close to where it was contaminated as possible. The practice of using plant- and soil-based techniques for treating and holding stormwater at the source to decrease stormwater runoff and increase evapotranspiration rates is called low-impact development (LID). A completed water budget on a non-irrigated green roof and found that for small precipitation events, the green roof was able to retain approximately 75% of the precipitation and reduce the peak flow by as much as 90% as well as increase the time of concentration to almost four hours. The time of concentration is the amount of time it takes for stormwater runoff to occur after a precipitation event has begun.

As a Statewide unified rule for stormwater management is being developed in Florida, there is a need to combine field and laboratory data for designing effective passive in-situ treatment units within stormwater retention/detention ponds for ultimate control of nitrogen impact on groundwater in Florida. The current study examined the ability of different sorption media to sorb nitrogen from stormwater contaminated with various nitrogen fertilizers. Sorption media of interest include but are not limited to tire crumb, sawdust, activated carbon, iron amended resins, orange peel, peat, leaf compost, naturally occurring sands, zeolites, coconut husks, polymers, and soybean hulls. The study consisted of running both batch and packed bed column tests to determine the sorption capacity, the required sorption equilibration tire and the flow-through utilization efficiency of various sorption media under various contact times when exposed to stormwater contaminated with various nitrogen fertilizers.

SUMMARY OF THE INVENTION

A primary objective of the invention is to provide methods, systems and apparatus for use of alternative media for removing nutrients associated with stormwater Best Management Practices.

A secondary objective of the present invention is to provide materials, compositions, substances and methods of making and using, for use as sorption and filter materials for a green roof stormwater treatment system associated with stormwater Best Management Practices.

A third objective of the invention is to provide methods, systems, apparatus and devices for stormwater treatment and management that is highly sustainable and uses material recycling and reuse, that is highly flexible with any landscape and built environment, and highly applicable in dealing with drought impact or other emergency events when various sources of wastewater and stormwater can be polished for reuse.

A fourth objective of the invention is to provide methods, systems, apparatus and devices for stormwater treatment and management having lower cost and higher benefit cost ratio and a lower maintenance burden.

A fifth objective of the invention is to provide methods, systems, apparatus and devices for stormwater treatment and management for sources of nitrogen and phosphorus in stormwater runoff from agricultural land uses, including runoff and enrichment of groundwater; aquaculture operation, including shrimp farm, fish farm, etc; forest clearance and geothermal inflows.

A first preferred embodiment of the invention provides a stormwater treatment system including a pond for storing a volume of stormwater and runoff stormwater, an in-situ treatment unit within the pond, the in-situ treatment unit having a sorption media therein, and a sump pump connected with the in-situ treatment unit for withdrawing the stored stormwater to gradually circulate the stored stormwater into the in-situ treatment unit to sorb nutrients from the stored stormwater. The sorption media includes at least one of a tire crumb, sawdust, activated carbon, iron amended resins, orange peel, peat, leaf compost, naturally occurring sands, zeolites, coconut husks, polymers, and soy bean hulls. In an embodiment, the sorption media consists of 50% sand, 30% tire crumb and 20% sawdust or 50% sand, 15% tire crumb, 25% sawdust and 10% limestone for testing. The pond can be a retention pond with the in-situ treatment unit including an entrance pipe in the retention pond for carrying the stormwater drawn by the sump pump into a filter containing the sorption media for removing the nutrient from the stored stormwater and a recirculation pipe for discharging the filtered stored stormwater to the retention pond. Alternatively, the pond can be a detention pond with the in-situ treatment unit including a riprap apron, a perforated riser located at the bottom of the riprap apron, and a goetextile media encased in a sorption media jacket around the perforated riser.

A second preferred embodiment provides a green roof stormwater treatment system for a building on a site including a protection layer installed on a roof of a structure for waterproofing and insulating the roof, a pollution control media layer on the protection layer for filtration and sorption of solids and dissolved materials found in stormwater, a growing media on top of the pollution control media for growing vegetation on the green roof and filtering the stormwater passing through the growing media, an irrigation system for extracting stored filtered stormwater and irrigating the vegetation, and a cistern to store the runoff stormwater between irrigation events and recycling runoff stormwater by irrigating the green roof with the stored stormwater to enhance hydrologic related factors including evapotranspiration, the filtering abilities of the plants and growing media, and the stormwater holding abilities of the plants and growing media, and to reduce the volume of stormwater runoff from leaving the site.

The irrigation system can include a sump pump connected with a filtration system for filtering surface runoff water and recycling the stored stormwater and the system can include a bioswale to remove silt and pollution from the surface runoff water and/or a grade line drainage basin connected with the bioswale for further collecting surface runoff water.

Further objects and advantages of this invention will be apparent from the following detailed description of preferred embodiments which are illustrated schematically in the accompanying drawings.

BRIEF DESCRIPTION OF THE FIGURES

FIG. 3b is a top view showing the layout of a system in the wet pond with in-situ treatment unit shown in FIG. 3a.

FIG. 4b is a side profile of the layout of a system in the dry pond with in-situ treatment units shown in FIG. 4a.

FIG. 8 is a table showing the evapotranspiration monthly average comparison of the test chambers with regular irrigation.

FIG. 9 is a table showing the evapotranspiration monthly average comparison of the test chambers with over irrigation.

DESCRIPTION OF THE PREFERRED EMBODIMENTS

Figure 1:
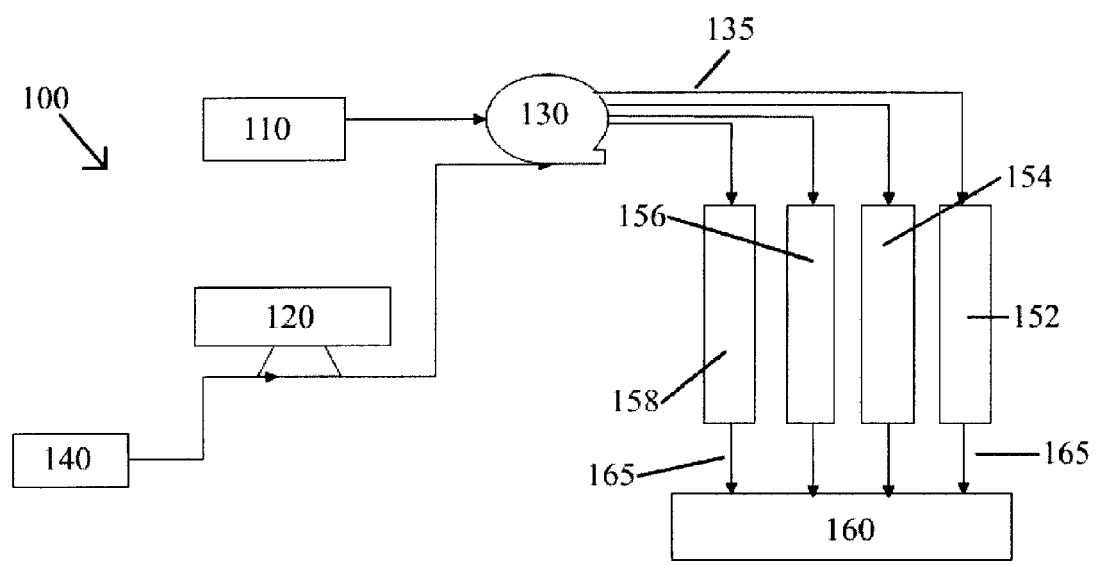
FIG. 1 is a schematic diagram of the column setup and system used for experimentation.
Figure 2A:
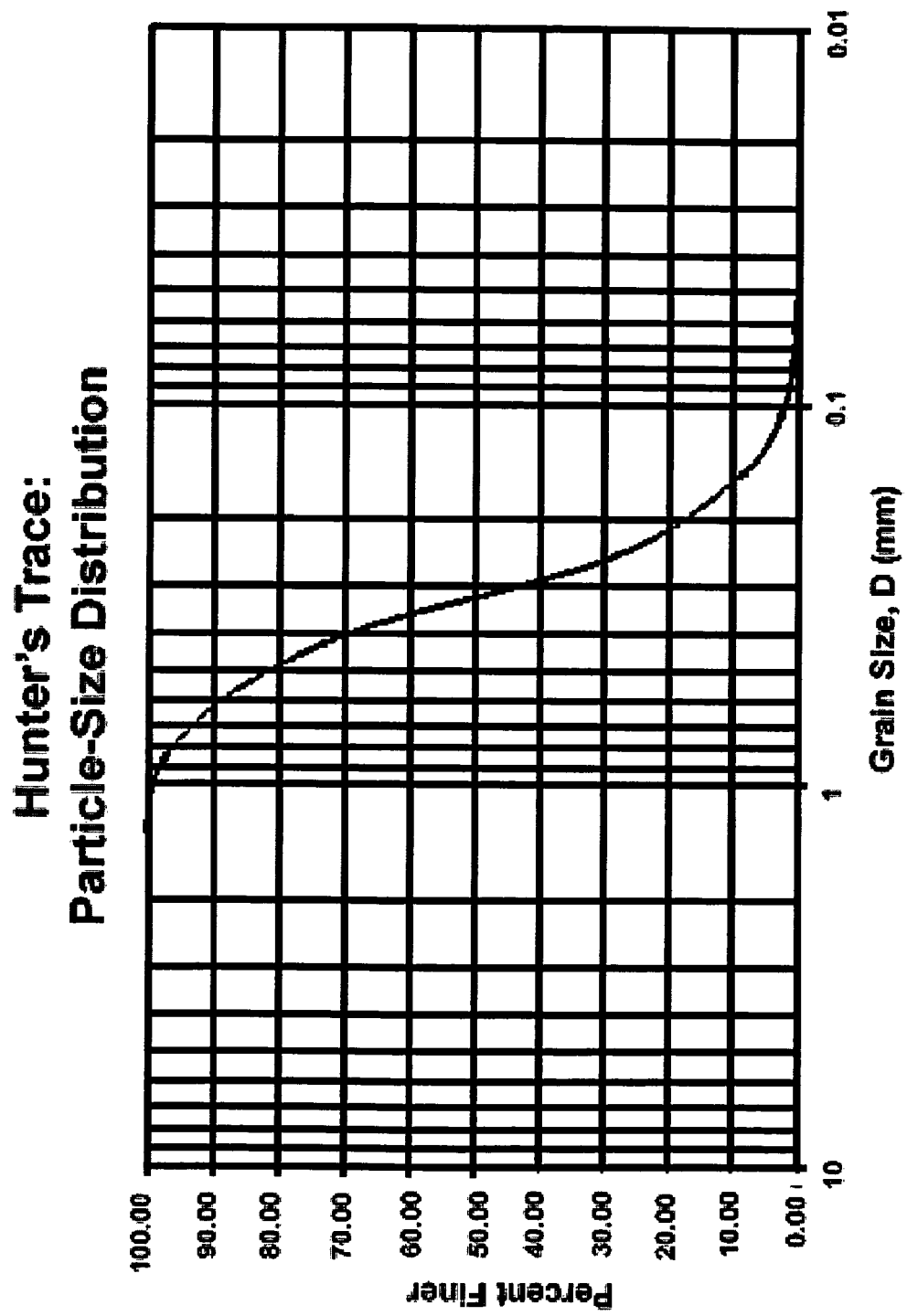
FIG. 2a is a graph shows the graduation curve for natural soil.
Figure 2B:
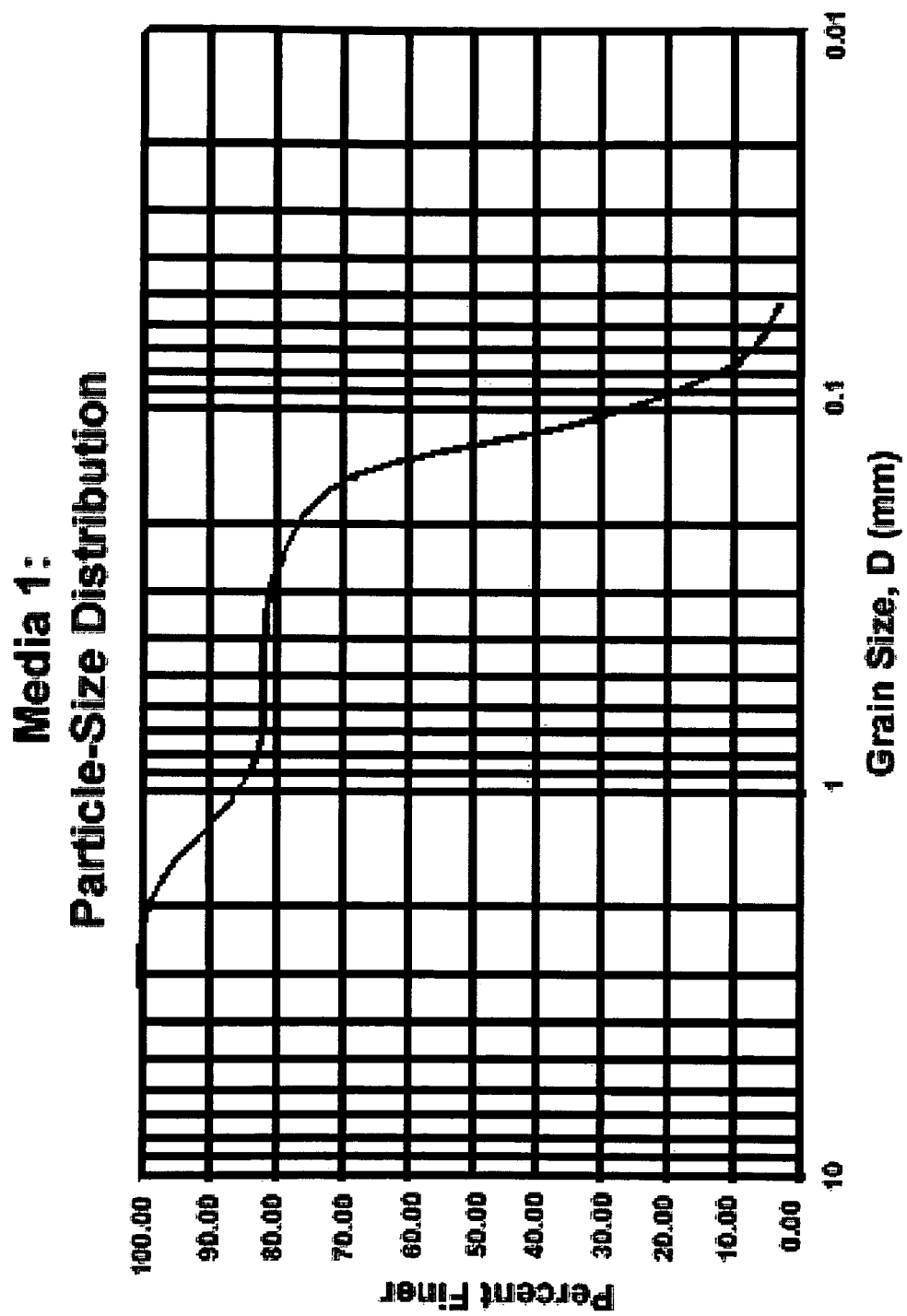
FIG. 2b is a graph shows the graduation curve for recipe1.
Figure 2C:
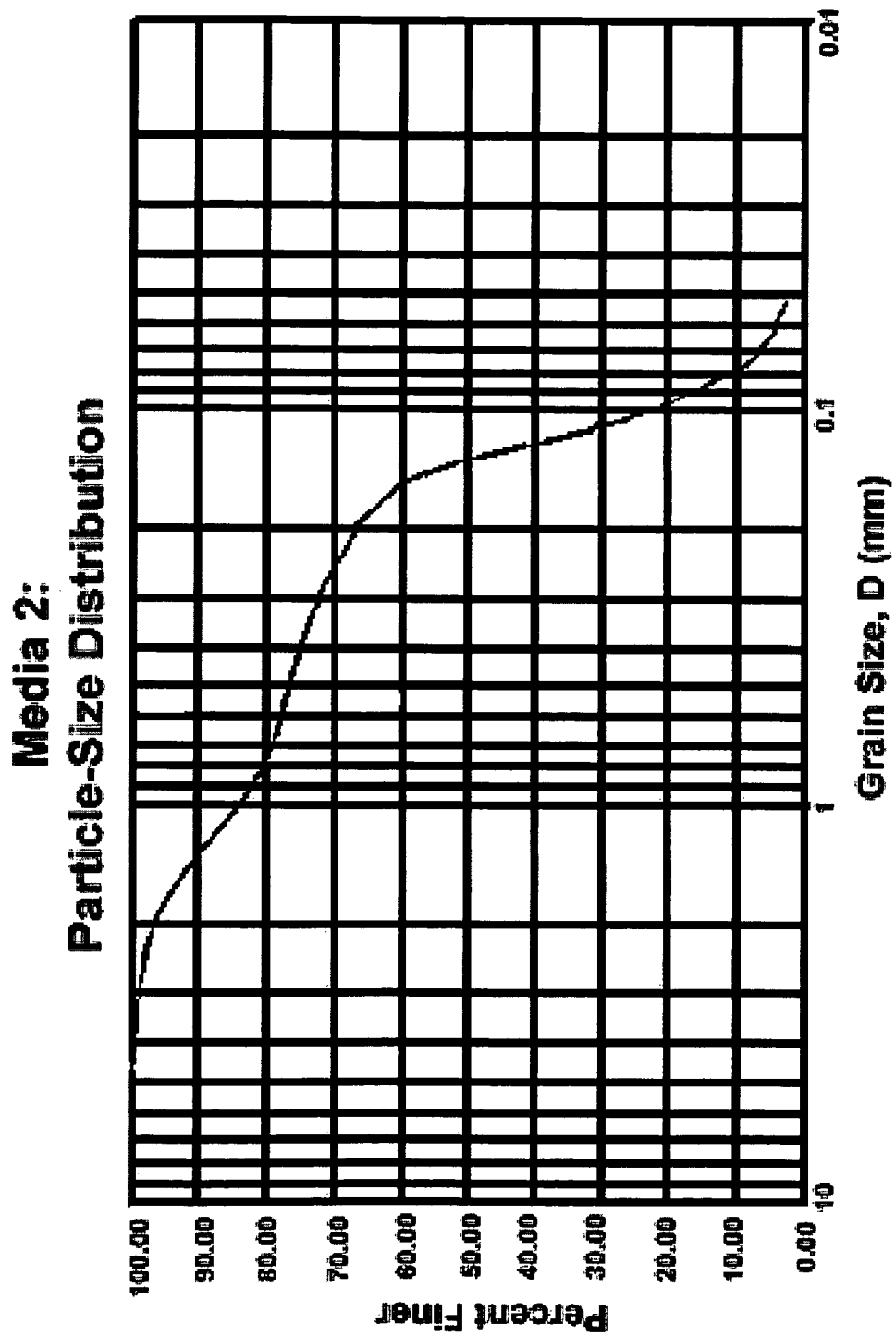
FIG. 2c is a graph shows the graduation curve for recipe 2.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 100 | column test system |
| 110 | reservoir |
| 120 | controller |
| 130 | pump |
| 135 | inlet lines |
| 140 | power source |
| 152 | column 1 |
| 154 | column 2 |
| 156 | column 3 |
| 158 | column 4 |
| 160 | drainage |
| 165 | outlet lines |
| 300 | wet pond system |
| 310 | wet pond |
| 320 | forebay |
| 330 | recirculation pipe |
| 340 | maintenance well |
| 350 | entrance pipes |
| 360 | in-situ treatment unit |
| 370 | emergency outlets |
| 380 | groundwater seepage |
| 400 | dry pond system |
| 410 | riprap apron |
| 415 | riser with hood |
| 420 | buffer landscape |
| 430 | shallow marsh |
| 440 | stabilization inlet |
| 450 | low flow channel |
| 460 | barrel |
| 465 | anti-seep collar |
| 470 | outfall |
| 480 | riser w/sorption media |
| 500 | water table |
| 510 | precipitation |
| 515 | rainwater runoff |

| | |
|---|---|
| 520 | evapotranspiration |
| 550 | aquifer |
| 600 | green roof water management system |
| 610 | green roof |
| 620 | air conditioner and sink |
| 630 | filter and sump pump |
| 640 | cistern |
| 650 | irrigation system |
| 660 | bioswale |
| 670 | drainage basin |
| 680 | overflow |

A laboratory column test method is a physical model, or microcosm, which attempts to simulate, on a small scale, a portion of the real world subsurface environment under a controlled set of experimental conditions. The ability to define and control stresses and boundary conditions makes soil column experiments well suited for identification and quantification of cause-and-effect relations in environmental processes, whereas investigation of such processes in the field often is limited to identification of statistical correlations due to the confounding nature of heterogeneity and unpredictability of temporal stresses. Columns are operated to approximate ponded infiltration beneath a stormwater infiltration basin. Such a condition is common in Florida during and following a storm where the water table is perennially below the basin bottom.

Under controlled laboratory conditions, different soils and amendments are tested to ascertain the effectiveness of each for reducing nitrate leaching. The nitrogen cycle—the transport and transformation of different nitrogen species is evaluated for each soil and soil/amendment mixture. The primary nitrogen species in the subsurface environment are organic nitrogen, ammonia, ammonium, nitrate, nitrite, and gaseous forms that include nitric oxide, nitrous oxide, and elemental nitrogen. Nitrogen species transformation is dependent on the number and types of nitrogen-degrading bacteria. These bacteria are affected by the presence of metals in concentrations high enough to inhibit biological activity. Thus, metal concentrations also must be documented within the soil water beneath dry infiltration basins.

Nonlinear sorption isotherms have significant environmental implications because concentration-dependent mobility of nitrogen compounds related to physical, chemical, and biological mechanisms complicate predictions of capacity in soil-media-water systems. To understand the factors that affect the nonlinearity of sorption isotherms, the impact of aggregation of soil and sorption materials on isotherm shape for a typical stormwater source contaminated with ammonia nitrogen was investigated using a column test.

For material characterization, six criteria defined by the co-inventors were followed to screen those possible sorption media: 1) the relevance of nitrification or denitrification process or both, 2) the hydraulic permeability or permeability, 3) the cost level, 4) the removal efficiency as evidenced in the literature with regard to adsorption, precipitation, and filtration capacity, 5) the availability in Florida, and 6) additional environmental benefits (not used). Table 1 shows the twenty-nine sorption media selected by the co-inventors that were evaluated and how each media was rated using the following rating scales. The rating system used to evaluate the twenty-nine sorption media is not commonly used and would not have been obvious to others in the art, instead it was developed by the co-inventors who are experts in their field.

Criteria 1: E (excellent), VG (very good), G (good), F (Fair), P (Poor)
    1a. phosphorous (unsaturated and saturated)
    1b. nitrogen saturated
Criteria 2 and 3: Low, Medium, High
Criteria 4 and 5: Yes or No

TABLE 1

| No. | Sorption Media | Criteria 1 | | Criteria 2 | Criteria 3 | Criteria 4 | Criteria 5 |
|---|---|---|---|---|---|---|---|
| | | 1a | 1b | | | | |
| 1. | Florida Peat | E | E | L | L | Y | Y |
| 2. | Alfalfa | G | G | H | H | N | Y |
| 3. | Activated carbon | E | P | H | H | N | Y |
| 4. | Carbon sand, Enretech sand, or sand | E | P | H | H | N | Y |
| 4a | Sandy Loam (SL), Loamy Sand (LS), and Sandy Clay Loam (SCL), Planting soil | E | E | M | L | Y | Y |
| 5. | Sawdust (untreated wood) | G | E | M | L | Y | Y |
| 6. | Paper, newspaper | G | E | M | L | Y | Y |
| 7. | Lignocellulosic Materials/wheat straw | G | G | H | H | N | Y |
| 8. | Tire Crumb /electron donor | VG | E | M | M | Y | Y |
| 9. | Limestone/ electron donor | F | E | H | L | Y | Y |
| 9a | Crushed oyster/electronic donor | F | E | H | L | Y | Y |
| 10. | Wood fiber/wood chips/compost | G | VG | H | L | Y | Y |
| 11. | Zeolites | VG | G | H | H | N | Y |
| 12. | Cotton waste | F | P | M | H | N | Y |
| 13. | Perlite | VG | P | H | H | N | Y |
| 14. | Shale and masonry sand | P | P | H | H | N | Y |

TABLE 1-continued

| No. Sorption Media | Criteria 1 | Criteria 2 | Criteria 3 | Criteria 4 | Criteria 5 | |
|---|---|---|---|---|---|---|
| 15. Waste foundry sand | P | P | H | M | N | Y |
| 16. Opoka | F | G | H | H | N | N |
| 17. Wollastonite | E | P | M | H | N | Y |
| 18. Iron sulfide (pyrite) | VG | G | H | H | N | N |
| 19. Limerock | P | VG | H | L | Y | N |
| 20. Polyurethane porous media | P | P | H | H | N | N |
| 21. Clinoptilolite | VG | P | M | H | N | Y |
| 22. Blast furnace slag | G | P | H | M | N | N |
| 23. Emulsified edible oil substrate | P | P | L | H | N | N |
| 24. Allophane | P | P | L | H | N | N |
| 25. Chitin | VG | P | M | H | N | N |
| 26. Pumice | P | P | H | H | N | N |
| 27. Bentonite | E | G | L | H | N | Y |
| 28. Oversize "pulverized brick | VG | F | H | M | Y | Y |
| 29. Polystyrene packaging | P | P | H | H | Y | N |

Eight sorption media were eventually selected for final consideration according to a multi-criteria decision making process. The eight most preferred sorption media selected by the co-inventors include peat, sandy loam, sawdust/wood chip, paper/newspaper, tire crumb, limestone/sulfur, crusted oyster and sulfur, and compost. Several sorption media recipes found in literature were used to form a matrix for batch testing, including those in Delaware (i.e., ⅓ sand, ⅓ peat, ⅓ mulch), Maryland (i.e., 50% sand, 30% top soil, 20% organics), and North Carolina (i.e., 80-85% sand, 8-12% clay, 3-5% sawdust).

Soil columns are simplified models of the actual environment. While permitting identification and quantification of cause-and-effect relations under carefully controlled conditions, they are not conducive to testing under the full range of variations present in the natural environment. Therefore, results from the soil column experiments are verified with full-scale, field-based investigations. Two stormwater infiltration basins, including Hunter's Trace pond, are selected in different environmental settings, considering land-use type and water-table depth. Possible land-use types of interest include auto-urban/commercial and low/medium density residential. Water-table depth (i.e. thickness of the unsaturated zone) is also an important factor. Possible water-table settings of interest include a shallow (e.g. seasonal high water table less than 5 ft below basin bottom) and a deep (e.g. seasonal high water table greater than 15 ft below basin bottom) setting.

The four column test system 100 shown in FIG. 1 was assembled in laboratory at University of Central Florida, Orlando for conducting the controlled experiment. Plexiglas columns 152, 154, 156 and 158 were purchased commercially from outside vendor with a diameter of 5 cm (2 inch) and length of 30 cm (1 foot). The joints of the columns are leak proof by using pipe threat sealant. Although the top and bottom of the column were closed, a removable screw cap system was used for adding media from the top of each column and removing the media from the bottom of the column. A filter with glass beads with a diameter of approximately 4 mm was placed at the bottom of each column to prevent the outward flow of finer particles from the column during the collection of samples.

Although each column is approximately 30 cm long, the media filled up to approximately 22.5 cm (9 inch) from the bottom. Tygon (Saint-Gobain, no. 16) tubes were added both top and bottom of each column for the flow of influent 135 to the column and effluent 165 from the bottom of each column. Influent is flowed to the column from a reservoir 110 by using a peristaltic pump 110 such as Master flex L/S, Cole-Parmer instrument. A power source 140 supplies electrical power to the pump 130 and a controller 120 allows a user to control the test system. The effluent drained from the bottom of the column is collected in a drainage reservoir 160.

The four common sorption media for the column tests were selected by the co-inventors based on a unique evaluation and testing process developed by the co-inventors. The two media mixes selected for use in the column tests are denoted as recipe 1 which consists of approximately 50% fine sand, approximately 30% tire crumb, and approximately 20% sawdust, and recipe 2 which is composed of approximately 50% fine sand, approximately 25% sawdust, approximately 15% tire crumb, and approximately 10% limestone. In a most preferred embodiment, recipe 1 consists essentially of 50% fine sand, 30% tire crumb, and 20% sawdust, and recipe 2 consists essentially of 50% fine sand, 25% sawdust, 15% tire crumb, and 10% limestone.

In the first column 152, the natural soil, which the natural soil collected at Hunter's Trace pond in this experiment, is loaded as a control case to observe the removal efficiency of natural soil under unchanged condition. During loading, the soil being oven-dried was compacted to meet the actual density of soil in field condition. Columns 154, 156 and 158 were all loaded with recipe 2 according to the volume of the column for testing of the removal efficiency of ammonia, nitrate and orthophosphate, respectively.

Tables 3-5 present the effectiveness of nutrient removal as a whole with respect to three preselected contaminated levels. One is the case with high strength impact in stormwater events that reflect an average of 5 mg/L of maximum input, 2.5 mg/L of medium input and 0.5 mg/L of minimum input. Experimental findings show that recipe 1 has relatively high removal efficiency in terms of both nitrite and nitrate due to their thermodynamic activity. The tables are arranged by such a way to have Tables 3, 4 and 5 for Hunters (Table 3), Recipe 1 (Table 4) and recipe 2 (Table 5).

TABLE 3

| Retention Time (hr) | Initial Concentration (mg/L $NH_3$—N) | Final Concentration (mg/L $NH_3$—N) | Removal Efficiency (%) |
|---|---|---|---|
| 1 | 5.00 | 1.48 | 70.34 |
| 3 | 5.00 | 1.07 | 78.60 |
| 5 | 5.00 | 1.03 | 79.40 |

| Retention Time (hr) | Initial Concentration (mg/L $NO_2$—N) | Final Concentration (mg/L $NO_2$—N) | Removal Efficiency (%) |
|---|---|---|---|
| 1 | 5.00 | 1.30 | 74.02 |
| 3 | 5.00 | 0.11 | 97.80 |
| 5 | 5.00 | 0.08 | 98.45 |

| Retention Time (hr) | Initial Concentration (mg/L $NO_3$—N) | Final Concentration (mg/L $NO_3$—N) | Removal Efficiency (%) |
|---|---|---|---|
| 1 | 5.00 | 0.71 | 85.72 |
| 3 | 5.00 | 0.35 | 92.98 |
| 5 | 5.00 | 0.30 | 94.00 |

| Retention Time (hr) | Initial Concentration (mg/L Ortho-Phosphate) | Final Concentration (mg/L Ortho-Phosphate) | Removal Efficiency (%) |
|---|---|---|---|
| 1 | 5.00 | 0.79 | 84.18 |
| 3 | 5.00 | 0.72 | 85.63 |
| 5 | 5.00 | 0.60 | 87.94 |

TABLE 4

| Retention Time (hr) | Initial Concentration (mg/L $NH_3$—N) | Final Concentration (mg/L $NH_3$—N) | Removal Efficiency (%) |
|---|---|---|---|
| 1 | 2.50 | 0.61 | 75.70 |
| 3 | 2.50 | 0.57 | 77.70 |
| 5 | 2.50 | 0.45 | 82.00 |

| Retention Time (hr) | Initial Concentration (mg/L $NO_2$—N) | Final Concentration (mg/L $NO_2$—N) | Removal Efficiency (%) |
|---|---|---|---|
| 1 | 2.50 | 0.87 | 65.32 |
| 3 | 2.50 | 0.12 | 95.24 |
| 5 | 2.50 | 0.05 | 98.06 |

| Retention Time (hr) | Initial Concentration (mg/L $NO_3$—N) | Final Concentration (mg/L $NO_3$—N) | Removal Efficiency (%) |
|---|---|---|---|
| 1 | 2.50 | 0.35 | 85.96 |
| 3 | 2.50 | 0.24 | 90.28 |
| 5 | 2.50 | 0.23 | 90.83 |

| Retention Time (hr) | Initial Concentration (mg/L Ortho-Phosphate) | Final Concentration (mg/L Ortho-Phosphate) | Removal Efficiency (%) |
|---|---|---|---|
| 1 | 2.50 | 0.51 | 79.73 |
| 3 | 2.50 | 0.48 | 80.90 |
| 5 | 2.50 | 0.49 | 80.40 |

TABLE 5

| Retention Time (hr) | Initial Concentration (mg/L $NH_3$—N) | Final Concentration (mg/L $NH_3$—N) | Removal Efficiency (%) |
|---|---|---|---|
| 1 | 0.50 | 0.07 | 86.00 |
| 3 | 0.50 | 0.05 | 89.20 |
| 5 | 0.50 | 0.05 | 89.80 |

TABLE 5-continued

| Retention Time (hr) | Initial Concentration (mg/L $NO_2$—N) | Final Concentration (mg/L $NO_2$—N) | Removal Efficiency (%) |
|---|---|---|---|
| 1 | 0.50 | 0.0073 | 98.54 |
| 3 | 0.50 | 0.0070 | 98.60 |
| 5 | 0.50 | 0.0068 | 98.64 |

| Retention Time (hr) | Initial Concentration (mg/L $NO_3$—N) | Final Concentration (mg/L $NO_3$—N) | Removal Efficiency (%) |
|---|---|---|---|
| 1 | 0.50 | 0.21 | 57.90 |
| 3 | 0.50 | 0.19 | 62.12 |
| 5 | 0.50 | 0.19 | 62.80 |

| Retention Time (hr) | Initial Concentration (mg/L Ortho-Phosphate) | Final Concentration (mg/L Ortho-Phosphate) | Removal Efficiency (%) |
|---|---|---|---|
| 1 | 0.50 | 0.38 | 23.71 |
| 3 | 0.50 | 0.37 | 24.72 |
| 5 | 0.50 | 0.30 | 39.92 |

Referring back to FIG. 1, in the columns, both nitrification/denitrification and sorption mechanisms work together in the removal process. The surface of sorption media plays an important role for the growth of microbes for nitrification/denitrification. However, since the adsorption process can dominate the system. Hence, the reason for such separation is to avoid the cycling effect between nitrate and ammonia due to microbial activities. The arrangement supports both adsorption kinetic and sorption isotherm studies. It is known to those skilled in the art that pH is an important factor to determine the nitrate removal pathway during the nitrification/denitrification process. Higher pH transforms the nitrate to nitrogen gas whereas lower pH transforms the nitrate back to ammonia.

The retention pond or wet pond is perhaps one of the most common types of stormwater treatment systems in the world. It provides a basin sized to hold the water-quality volume of stormwater and reduce peak flow runoff. Treatment of stormwater occurs during the interstorm period when long retention times allow for particle settling and biodegradation. The key in system design is to utilize a sedimentation forebay that holds approximately 25% of the water-quality volume and drains slowly through a standpipe into the main basin. When the forebay capacity is reached, the contiguous storm events provide a fresh influx of stormwater that forces some of the standing water out of the system and flow occurs over a weir into the permanent pool. However, many of the wet ponds might not have such a sedimentation forebay. The basic retention pond includes only the permanent pool, which serves to attenuate peak flows by storing a specified volume of stormwater.

Figure 3A:
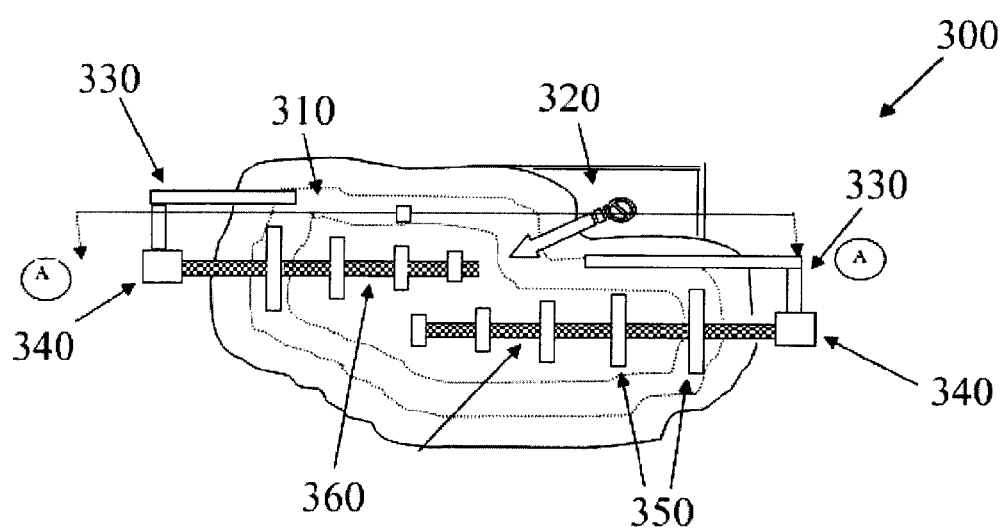
FIG. 3a is a top view showing the layout of a system in the wet pond with in-situ treatment units.
Figure 3B:
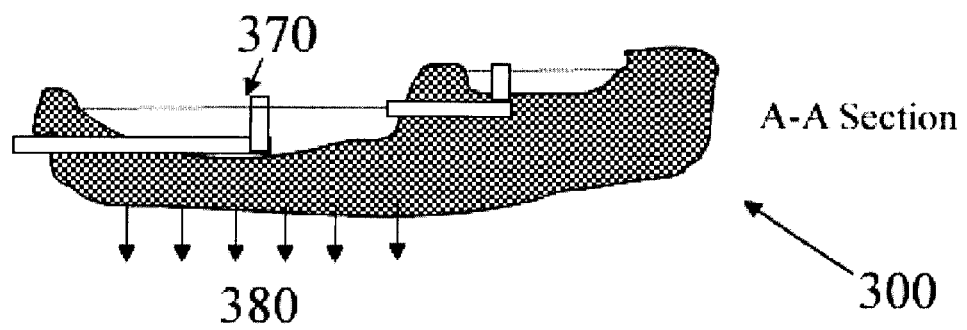

For stormwater treatment system 300 with in-situ treatment units 360 filled with sorption media, filtration occurs in the large volume of stormwater and runoff water in the stormwater pond 310 which allows for high retention time and physical infiltration. The captured stormwater withdrawn into the sump pump 340 in from by entrance pipes 350 is gradually circulated into in-situ treatment units 360 lain down at the bottom of the permanent pool. FIGS. 3a and 3b show a top view and side profile, respectively, the layout of a system 300 in the retention ponds. As shown in FIG. 3b, the filtered pond water seeps 380 into the aquifer.

Figure 4A:
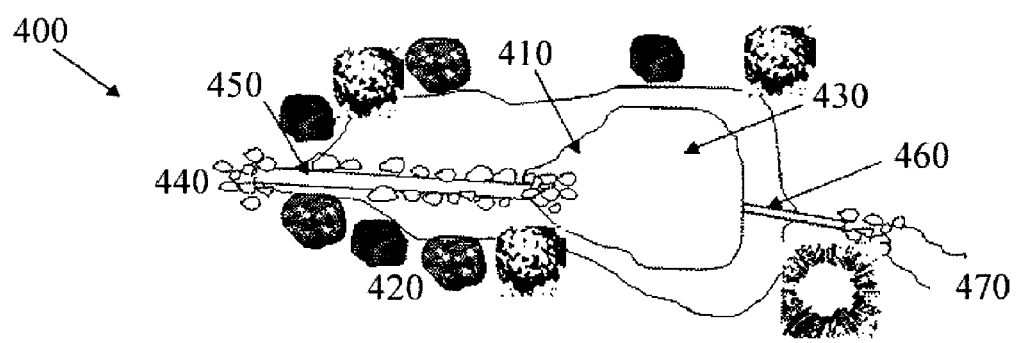
FIG. 4a is a top view showing the layout of a system in the dry pond with in-situ treatment units.
Figure 4B:
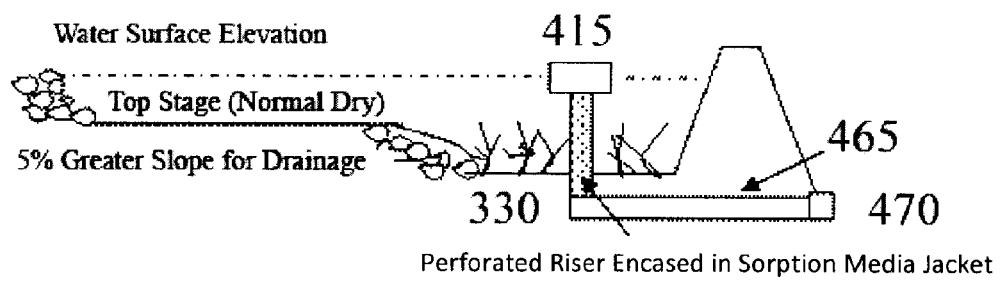

Dry detention ponds are areas that are normally dry, but function as detention reservoirs during storms. The removal efficiency of these ponds is less than that in wet ponds. The volume of the pond should be at least equal to the average runoff event during the year. The design of dry detention ponds for nitrogen removal should be considered in a relatively flexible way. Dry detention ponds have dual purpose in both quality and quantity control. Without having specific sorption media, typical nitrogen removal rates in dry detention ponds would be between 10%-20%. A stabilized inlet 440 that includes a low-flow channel 450 allows rainwater runoff to enter the shallow marsh 430. Sorption media can be incorporated into pond design by using geotextile placed at the bottom of the riprap apron 410 area and encased in a sorption media jacket placed around a perforated riser 480 as shown by the layout of dry ponds 400 with in-situ wet pond water treatment units as shown in FIGS. 4a and 4b. The dry pond stormwater treatment system includes a buffer landscape 420 with native tress and other vegetation. FIG. 4b shows anti-seep collars which prevent seepage flow from happening along the perimeter of the pond. In both FIGS. 3 and 4, in regard to positioning of the filtering material, it can be made flexible as a reactor-type setting that has not to be changed regularly. According to the isotherm test, the material mixes can last between approximately 20 and approximately 30 years.

Figure 5A:
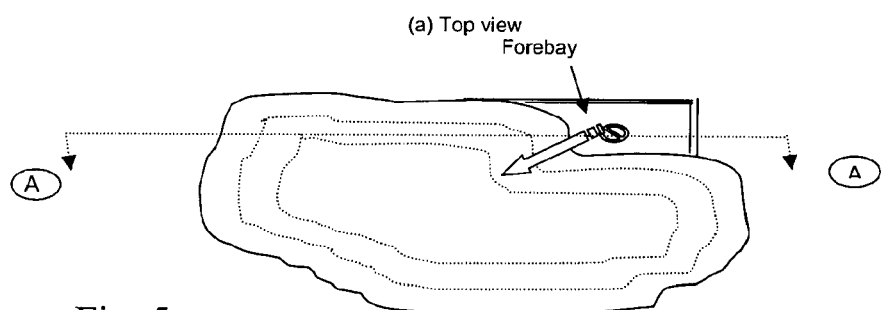
FIG. 5a is a top view of an infiltration basin.
Figure 5B:
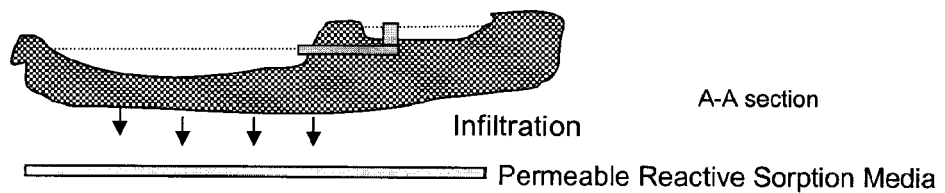
FIG. 5b is a top view of an infiltration basin.
Figure 6:
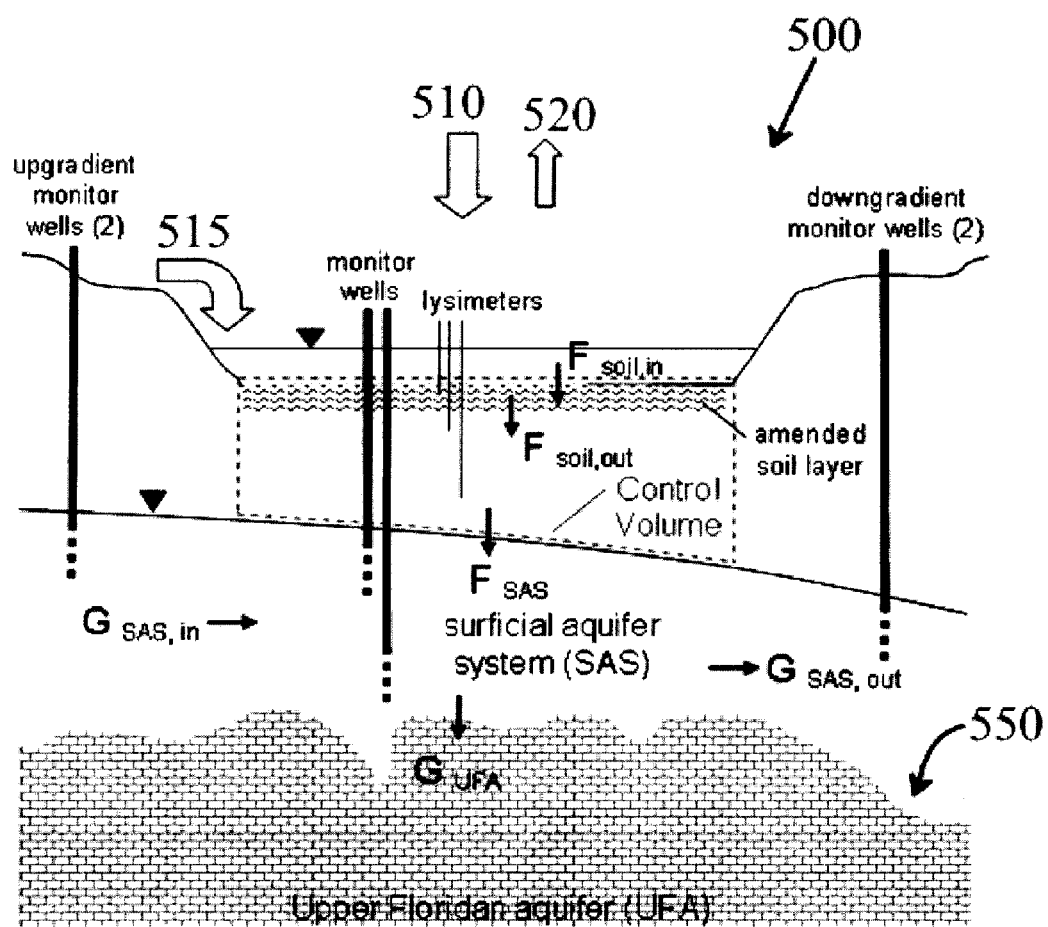
FIG. 6 is a side view of a basin and the water table showing the mass balance and the soil zone beneath the bottom of the basin and the water table.

As shown in FIGS. 5a, 5b and 6, another type of setting is to deploy the sorption media layer at distance away from the bottom of the infiltration basin. Because the focus is attenuation of nitrogen in natural and amended media in basin bottoms, the control volume for the mass balance is the soil zone beneath the bottom of the basin and the water table as shown in FIG. 6. Stormwater fluxes at the basin bottom (infiltration) and at the water table (groundwater recharge) are estimated based on field and laboratory testing of soil properties. For example, infiltration rates are measured using double-ring infiltrometer tests and groundwater recharge can be estimated using the Darcian method.

Nitrogen species' (nitrate, nitrite, ammonium, and organic nitrogen) concentrations were determined in stormwater samples collected at least monthly at several depths: (1) ponded stormwater; (2) unsaturated zone within and beneath the amended soil layer; and (3) saturated zone. Event-based sampling at more frequent intervals can also be performed. All water samples are analyzed by the U.S. Geological Survey National Water Quality Laboratory (Denver, Colo.). Measurements of temperature, specific conductance, pH, and dissolved oxygen will be obtained in the field concurrent with sample collection. Water samples are collected quarterly from the pond, unsaturated zone, and saturated zone and analyzed for organic carbon, iron, manganese, and sulfate, in order to identify the presence of compounds that could serve as electron donors for the denitrification process.

Reductions in nitrate concentrations also result from dissimilatory nitrate reduction. This process results in conversion of nitrate to ammonium, which can readily adsorb to mineral surfaces. Soil cores are collected at selected locations and times and analyzed for adsorbed ammonium as well as particulate organic nitrogen that can have been strained out of the infiltrating stormwater. Each basin is tested with natural soils, representing the current design criterion, and with amendments combined with the natural soil (as determined from the soil column experiments), representing an alternative design criterion for infiltration BMPs. The combination of water fluxes and nitrogen concentrations permit computation of mass fluxes of each nitrogen species.

Still referring to FIG. 6, field instrumentation and testing required at each basin includes: (1) a minimum of six monitoring wells installed within, upgradient, and downgradient of the basin; (2) pressure transducers for continuous monitoring of groundwater level; (3) suction lysimeters for collection of soil moisture from the unsaturated zone; (4) double-ring infiltrometer tests for infiltration capacity of soil; (5) tensiometers for measuring soil matrix potential and computation of soil-water fluxes; (6) time domain reflectometry probes for measuring soil moisture content; and (7) undisturbed soil cores from the unsaturated zone to analyze for water-retention characteristics and saturated hydraulic conductivity.

The use of green roofs in the United States for stormwater management purposes has become more popular in recent years. A specifically designed green roof stormwater treatment system, one with a cistern, is an effective way to reduce both the volume and mass of pollutants from stormwater runoff. While it has been speculated that green roofs also offer water quality benefits, little research has been done to quantify this claim. The first green roof system is for a residential home in Orlando which is the show case home for the 2007 National Home Builders Show and is called the New American Home (NAH).

Figure 7A:
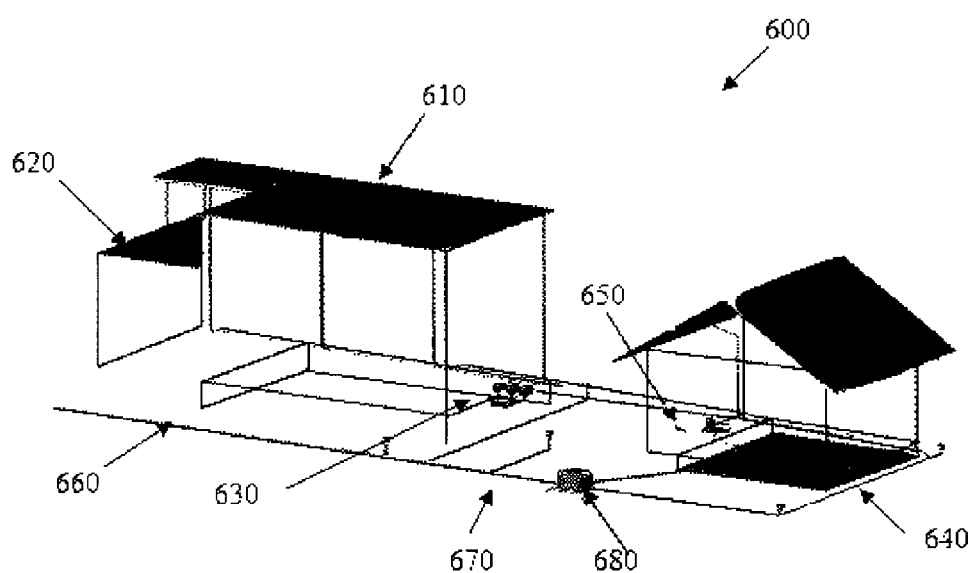
FIG. 7a is a schematic diagram of a building with a green roof water treatment system.
Figure 7B:
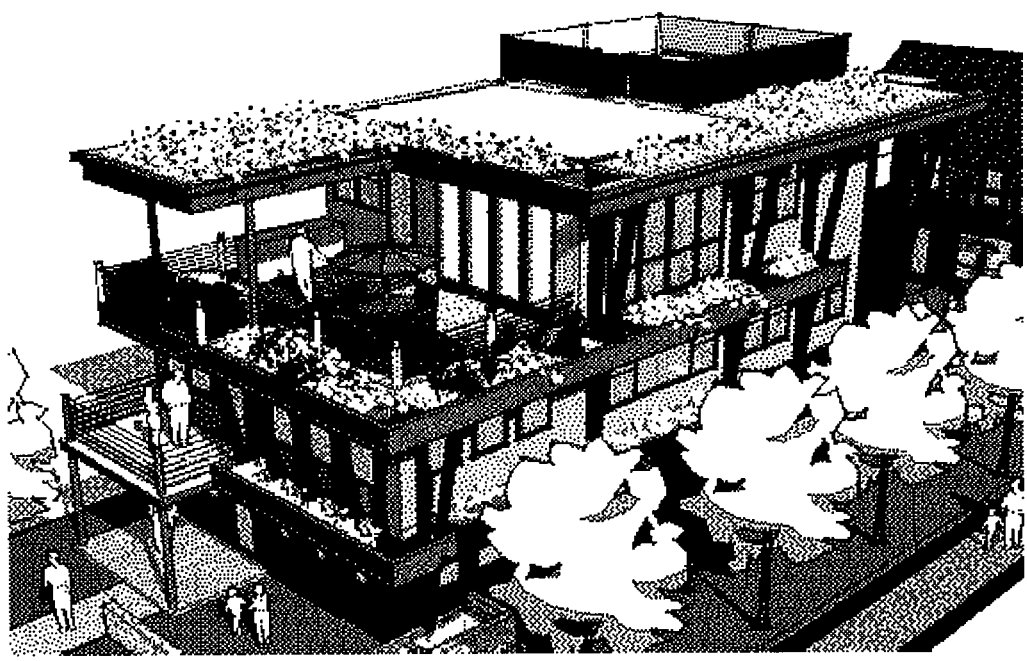
FIG. 7b is a perspective view of a building with a green roof water treatment system

In another embodiment of this patent application, focus is placed on the water quality benefits of a specifically designed green roof stormwater treatment system at the New American Home. The green roof stormwater treatment system 600 as shown in FIGS. 7a and 7b includes an irrigated green roof with a cistern 640 to store the stormwater and uses a selected media for pollution control along with a growth media to sustain plant species on the roof. The primary water quality measures of concern are physical parameters and nutrients. The benefits of using green roof as stormwater treatment systems is confirmed in terms of the effectiveness of specific stormwater designs.

Recycling the stormwater runoff and irrigating the green roof with stored water enhances hydrologic related factors such as evapotranspiration, the filtering abilities of the plants and media, and the water holding abilities of the plants and media, as well as greatly reduce the volume of stormwater runoff leaving the site. In order to achieve this, a cistern needs to be used to store the water between irrigation events. The only two ways water leaves the system is through evapotranspiration and as stormwater runoff when the system reaches storage capacity from large storm events. The only two ways water will enter the system is from precipitation and from a supplemental source, such as the cistern that is used for irrigation. The efficiency of the system is determined from the total precipitation and the total overflow.

The intensive flat green roof depth is approximately eight inches in a first test site at New American Home, is composed of drainage, pollution control, and growth media with vegetation that is commonly found in Florida. Before applying the sorption media technology to the green roof, the green roof chambers were used as a laboratory test to study different types of growing media, different irrigation rates, and the addition of plants and how the filtrate quality and quantity are affected. Control chambers are also built into the model of the conventional roof on the general building. The control is used to compare the water quality and quantity effectiveness of the plants, irrigation rates, and different pollution control media's filtration/adsorption processes. The year long water budget calculations showed that the system reduced the volume of stormwater runoff relative to runoff from a conventional roof. The green roof stormwater treatment system was proved effective at reducing the mass of pollutants relative to that from a conventional roof also.

The experiment showed that a green roof with a cistern from which irrigation water is recycled offers an aesthetically pleasing treatment solution that utilizes unused space to treat and store stormwater runoff. With the adaptabilities of a green roof system, it can be applied to almost any roof structure. The present invention provides developers and builders new options for stormwater management source control to treat polluted stormwater and reduce the volume of discharge and thus eliminate an impervious surface and pollution contributor. The use of pollution control combined with growing media was the focus in the study. The results showed that the material mixes (Black & Gold™) in the pollution control media (i.e., sand, tire crumb, and sawdust) is effective at removing both nitrogen and phosphorus. In a preferred embodiment, the pollution control media is placed as a layer under the expanded clay growing media to get the benefits media expected.

Figure 10:
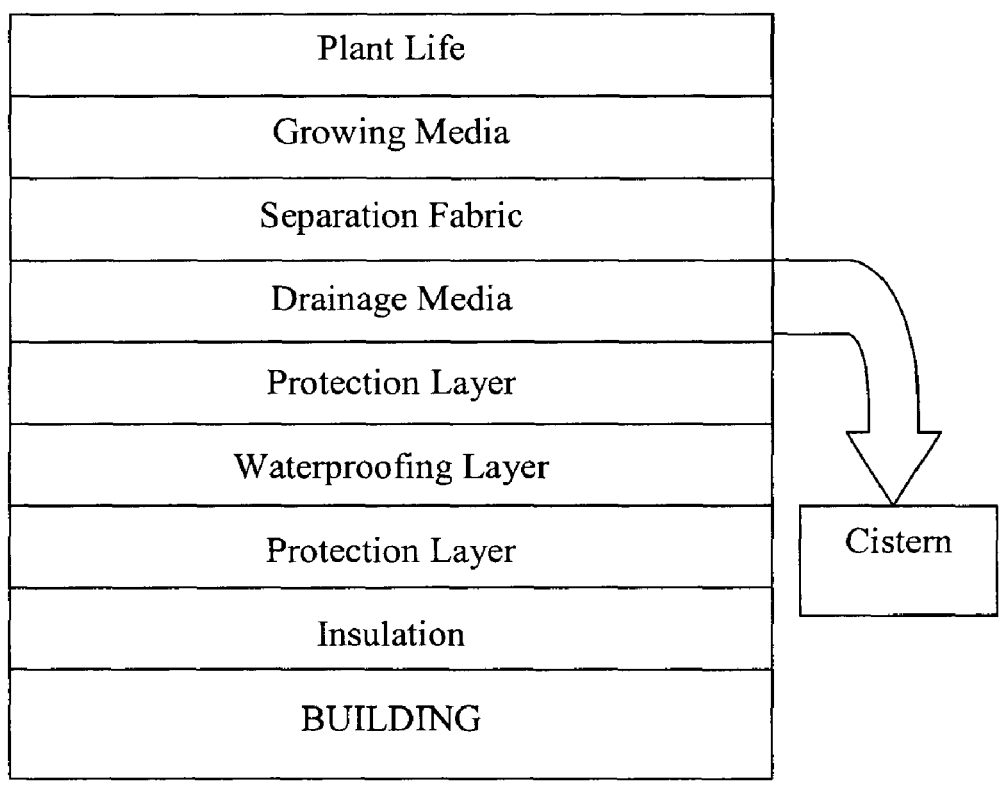
FIG. 10 is a diagram showing the layers in a green roof according to an embodiment of the present invention.

Irrigated green roof experimental chambers in Central Florida were instrumented to quantify the water quantity of the runoff leaving the roof. There were 18 experimental green roof chambers built to physically model a real world green roof system. These chambers were located at the stormwater management laboratory at University of Central Florida and used to isolate certain variables of interest. There were eighteen green roof chambers with an area of 16 ft$^2$. The overall green roof design section was held constant in all of the chambers. As shown in FIG. 10, this includes the use of insulation with an R (insulation efficiency) value of approximately 19, which is installed directly onto the roof structure. The same waterproof membrane was used, which acts as both a root barrier and a waterproofing layer, and was installed over the insulation. The same protection layer (which is a three-layer material with a non-woven fabric on either side of a plastic mesh) was also used to protect the waterproofing membrane against being punctured or damaged. This protection layer is installed directly on top of the waterproofing layer.

The drainage media used was also consistent with that used for the full size roof, not just in material type but also at the same depth of 2 inches. The drainage media, which is installed directly onto the protection layer of the building, creates additional pore space allowing water to flow more freely to the point of discharge while maintaining a low flow rate. The same separation fabric, which is installed directly on top of the drainage media, was also used. The purpose of the separation fabric is to keep the fine particles associated with the growing media out of the drainage media and prevent clogging.

There were two different types of growing media mixes studied; an expanded clay mix and a tire crumb mix (Black & Gold™). It should be noted at this time that the experimental chambers with the tire crumb mix were notated as both T and B&G. The expanded clay mix consists of 60% expanded clay, 15% peat moss, 15% perlite and 10% vermiculite. The tire crumb mix consists of 40% tire crumb from recycled automobile tires, 20% expanded clay, 15% peat moss, 15% perlite and 10% vermiculite. All of the preceding percentages are percent by volume.

The species of plants, which also were held constant for this experiment, include; *Helianthus debilis* (Dune sunflower), *Gaillardia pulchella* or *aristata* (Blanket flower), *Lonicera sempervirens* (Coral honeysuckle), *Myricanthes fragrans* (Simpson's stopper), *Clytostoma callistegioides* (Argentine trumpet vine), *Tecomeria capensis* (Cape honeysuckle), and *Trachelospermum jasminoides* (Confederate jasmine). The plants were selected based on hardiness, drought tolerance, the aesthetically pleasing aspects of the plant and whether or not they are native to Florida. The first four plant species are Florida natives while the last three are not.

Two different irrigation rates were studied to determine the effects on water quantity, regular irrigation and over irrigation. The regular irrigation consisted of two weekly irrigation events that totaled 1.0 inch of water per week while over irrigation consisted of two weekly irrigation events that totaled 2.0 inches of water per week. Irrigation occurred whenever the precipitation for the last 24 hours was less than the volume to be irrigated. The added benefit of the biological processes associated with the use of plants was also examined. This was determined by constructing some of the chambers with only growing media and no plants and some with both growing media and plants. The purpose of this aspect of the experiment is to qualify which set-up (plants or no plants, regular irrigation vs. over-irrigation, etc.) most efficiently reduces the volume of stormwater runoff. The water quality analyses were preformed weekly with sampling occurring from the cistern. The water quality parameters studied were the following: ortho-phosphorus, total phosphorus, nitrate+nitrite, ammonia, TKN, total nitrogen, total suspended solids, total dissolved solids, total solids, pH, and alkalinity.

The testing procedures used for the determination of ortho-phosphorus was the Hach method for the low range concentration detection which was adopted from the Standard Methods 4500-P E ascorbic acid method, the Hach DR 5000 spectrophotometer was used for this procedure. The testing procedures used for the determination of total phosphorus was the Standard Methods 4500-P B 5 persulfate digestion method for the conversion of organic phosphorus to ortho-phosphorus and the previously mentioned Hach method for the final concentration determination. The testing procedure for the determination of nitrate+nitrite was the Hach method for the low range concentration detection which was adopted from the Standard Methods 4500-NO$_3^-$ E cadmium reduction method, the Hach DR 5000 spectrophotometer was used for this procedure. The testing procedure for the determination of ammonia was the Standard Methods 4500-NH$_3$ D using the Accumet™ AR50 Dual Channel pH/Ion/Conductivity Meter with the Thermo Electron Corporation Orion 9512 Ammonia selective probe. The testing procedure for the determination of TKN was the Standard Methods procedure 4500-N$_{org}$ B Macro-kjideal method. The total nitrogen was determined by adding up the nitrogen species. The total suspended and dissolved solids were determined using the Standard Methods 2540 D and C respectively. The total solids were determined by summing the total suspended and dissolved solids. The pH was determined using the Accumet™ AR50 dual channel pH/Ion/Conductivity Meter with the AccutupH$^{+™}$ selective probe. The alkalinity was determined using the Standard Methods titration method 2320 B. Each sample was collected weekly and stored according to EPA Test Methods Technical Additions to Methods for Chemical Analysis of Water and Wastes. All of the analysis was preformed in a timely manner, according to proper analyses and within 36 hours of sampling.

The average monthly evapotranspiration (ET) rates as well as the average monthly filtrate factor for an irrigated green roof in central Florida were estimated from actual measurements for the green roof. The monthly evapotranspiration rates were calculated using a mass balance approach. The filtrate factor was calculated as the fraction of water collected per water added from both precipitation and irrigation. The evapotranspiration rates were calculated daily and then averaged for each month. The inputs into the system are the precipitation and irrigation volumes. The outputs to the system are evapotranspiration and filtrate volumes. The monthly estimated evapotranspiration and calculated filtrate factors from the experimental data are shown in Table 6 (regular irrigation) and Table 7 (over irrigation) shown in FIGS. 8 and 9, respectively.

Both the evapotranspiration rates and the filtrate factors change with the season were recorded. As would be expected, the evapotranspiration rates increased during the summer months and decreased during the winter months. The filtrate factor did the opposite, which is decreased during the summer months and increased during the winter months. With closer examination of green roof chambers, it can be seen that the evapotranspiration rates for both the vegetated and non-vegetated chambers are essentially the same during the winter months. This calculation shows that while necessary during the summer months the irrigation rates can be reduced during the winter months.

The irrigation rates per week had no significant affect on the evapotranspiration rates, $\alpha=0.05$. It should be noted that this conclusion is due to the fact that some, not all, of the experimental chambers accepted the null hypothesis. The z scores were however, high for over irrigation suggesting that evapotranspiration rates are higher just not significantly higher. The results from the hypothesis testing on the filtrate factor show that the irrigation regime does have a significant effect, $\alpha=0.05$. That is, the filtrate factor is higher for over irrigation and lower for regular irrigation. This shows that the higher the soil moisture the higher the filtrate factor, which means that the green roof has a larger filtrate volumes if the soil moisture is kept relatively wet during most of the year.

The use of vegetation to increase evapotranspiration rates and decrease the filtrate factor was also examined. From the tests, it is shown that vegetation significantly increases evapotranspiration rates, $\alpha=0.05$. All the null hypotheses were rejected except one, but that one had a large positive z score. It should be noted that the one accepted hypothesis test would also be rejected if using a lower $\alpha$. The eight tests show that all chambers with vegetation have higher evapotranspiration rates than chambers without vegetation.

The tests show that vegetation significantly lowers the filtrate factor, $\alpha=0.05$. All the null hypotheses for this test were rejected except one, but that one had a large negative z score. The eight tests show that all chambers with vegetation have lower filtrate factor than chambers without vegetation. The overall results for this set of tests show that vegetation increases evapotranspiration rates and lowers the filtrate factor.

The choice of media types between the Black & Gold™ mix and the expanded clay mix has no significant affect on evapotranspiration rates, $\alpha=0.05$. While five of the tests rejected the null hypothesis, three did not. It should be noted, however, the z scores were large positive numbers indicating that the Black & Gold™ mix did increase the evapotranspiration rates, just not significantly. The filtrate factor also is not affected by the media selection, $\alpha=0.05$. Only three of the eight chambers rejected the null hypothesis, although, all but one chamber had a rather large negative z score. This indicates that the Black & Gold™ mix did reduce the filtrate factor when compared to the expanded clay mix, just not a statistically significant reduction.

The affect of vegetation on the cistern water quality was also studied. Based on the test statistics, it can be seen that for pH, alkalinity, total solids, total dissolved solids, turbidity, total nitrogen, TKN, total phosphorus, and ortho-phosphorus, vegetation makes a significant difference, $\alpha=0.05$. Specifically, vegetation neutralized the pH and increased the alkalinity concentration of the green roof filtrate. Vegetation was also shown to increase the concentration of total solids and total dissolved solids although it should be noted that the increase was more significant in the Black & Gold™ growing media than the expanded clay growing media. The results of the turbidity analysis showed that when vegetation was used with the expanded clay growth media the turbidity was reduced while when used with the Black & Gold™ growth media the turbidity was increased. This is probably due to the fact that the plants did not grow as well in the Black & Gold™ growth media.

The total nitrogen and TKN results were very similar showing that the addition of vegetation to the expanded clay growing media reduced the concentration of both while the vegetated Black & Gold™ chambers showed no significant difference. This is again probably due to the poor plant growth observed in the Black & Gold™ chambers. Vegetation was also shown to significantly reduce the concentration of both total and ortho-phosphorus. There is no significant difference, $\alpha=0.05$, in the other water quality parameters due to acceptance of the null hypothesis, or inconsistent rejection of the null hypothesis.

There were two different growing media examined for water quality, Black & Gold™ and an expanded clay mix. Both media had the same components with the exception of the Black & Gold™ which had an addition of recycled ground up automobile tires. Test statistics showed that growing media selection significantly affects, $\alpha=0.05$, the following water quality parameters: pH, alkalinity, total solids, total dissolved solids, total phosphorus and ortho-phosphorus. Specifically, the Black & Gold™ growing media was shown to neutralize the pH, increase the alkalinity, total solids, and total dissolved solids concentration, and reduce the total phosphorus and ortho-phosphorus concentrations. There was no significant effect, $\alpha=0.05$, on the other water quality parameters.

An important comparison is the green roof stormwater treatment system versus the control roof. The results show that for each water quality parameter, there exists a significant difference between the control chambers and each experimental chamber, vegetated or not. The results for the comparisons of the vegetated chambers and control chambers show that most of the water quality parameters are significantly different, $\alpha=0.05$. The parameters that show a significant difference in pH, alkalinity, total solids, total dissolved solids, nitrate+nitrite, ammonia, and total phosphorus.

The experiments showed that the green roof chambers were effective at increasing the pH to neutral levels as well as increasing the buffering capacity (alkalinity) of the green roof filtrate. The experiments also showed that the total solids, total dissolved solids, and total phosphorus concentrations were increased when compared to a conventional roof and the green roof was shown to significantly reduce the concentration of nitrate+nitrite and ammonia when compared to a conventional roof.

The following parameters showed no significant difference between the Black & Gold™ media and the control roof while showing a significant difference between the expanded clay media and the control roof. These parameters are turbidity and ortho-phosphorus. The turbidity showed a reduction while the ortho-phosphorus showed an increase in concentration. The other water quality parameters showed no significant difference from the control chamber concentration.

The testing for non-vegetated chambers verses control chambers shows similar results as above. Specifically, pH, alkalinity, total solids, total dissolved solids, total nitrogen, TKN, ammonia, nitrate+nitrite, total phosphorus, and ortho-phosphorus all are significantly different, $\alpha=0.05$, for a chamber with growing media and no plants when compared with a control chamber. As shown with the vegetated chambers, the media only chambers are effective at neutralizing the pH and increasing the buffering capacity of the green roof filtrate when compared to the control roof. The non-vegetated chambers also significantly increased the total solids, total dissolved solids, total nitrogen, TKN, total phosphorus and ortho-phosphorus concentration when compared to the control roof. As with the vegetated chambers the non-vegetated chambers reduced the ammonia and nitrate concentration compared to the control roof. The other water quality parameters show no significant difference from the control chambers.

The schematic of the green roof stormwater management system 600 is shown in FIG. 6a and a perspective view of an artist rendition is shown in FIG. 6b. The stormwater management included water from the green roof 610, a home sink and air conditioner 620, filtration system and sump pump 630, cistern 640, irrigation/reuse system 650, yard inlets, a bioswale 660, a grade line drainage basin 670 and a Weir and overflow to storm sewer 680. All the system components were monitored for water quality simultaneously for four months (June-September).

The flow from the cistern was monitored for one year. There was no overflow volume from the cistern, but the rainfall was less than normal or approximately 110 centimeters (43 inches). Normal rainfall is approximately 127 centimeters (50 inches) per year.

Water quality in the cistern, yard drainage basin, sump pump, and before filtration was measured. Tables 8 and 9 show the average values.

The filter sample was a composite from each filter in the filter box. Water samples were taken at each location on days without rain due to standing water in each location. However, when it was raining, water was also sampled. In the cistern, there were no significant differences in the quality of water during a rain event and when there was no rain event. This could be because of the large volume of water in the cistern and the frequency of rainfall.

TABLE 8

| Sample Location | pH | ALK (mg/l) | TSS (mg/l) | TDS (mg/l) | TS (mg/l) | Conductivity µS @ 25C | Turbidity NTU | BOD$_5$ (mg/l) |
|---|---|---|---|---|---|---|---|---|
| Drainage Basin | 6.3 | 45 | 12 | 107 | 119 | 129 | 2.96 | 7.13 |
| Before Filter | 6.8 | 45 | 24 | 134 | 158 | 140 | 1.72 | 11.68 |
| Sump Pump | 6.9 | 45 | 7 | 135 | 142 | 137 | 2.30 | 9.02 |
| Cistern | 7.5 | 88 | 2 | 161 | 163 | 216 | 0.76 | 1.37 |

TABLE 9

| Sample Location | NH$_3$ (µg/l) | NOx—N (µg/l) | Nitrite (µg/l) | TN (µg/l) | SRP (µg/l) | TP (µg/l) | Fecal Coliform (cfu/100 ml) | E. Coli (cfu/100 ml) |
|---|---|---|---|---|---|---|---|---|
| Drainage Basin | 270 | 333 | 19 | 4706 | 24 | 118 | 733 | 2 |
| Before Filter | 481 | 1161 | 71 | 5190 | 39 | 216 | 337 | 71 |
| Sump Pump | 191 | 1437 | 113 | 6144 | 39 | 91 | 896 | 121 |
| Cistern | 48 | 185 | 12 | 329 | 46 | 76 | 60 | 37 |

The nutrients and bacteria concentrations were lower in the cistern compared to the other locations. The filter boxes contained the highest level of ammonia at 481 µg/L while the cistern contained an average concentration of 48 µg/L (90% less). Nitrate levels in the sump pump sample were at an average concentration of 1,437 µg/L and the cistern sample concentration was at a level of 185 µg/L (87% less). In the sump pump location, it should be noted that organic nitrogen was the primary species in TN or approximately 67% of TN. Organic nitrogen was not measured for all samples. The cistern concentration of organic nitrogen was about 30% of the TN.

Soluble reactive phosphorus (SRP) was the only constituent that had a higher reading in the cistern than the other sample locations. The level in the cistern on average was 7 ug/L higher in the cistern (46 µg/L) than in the filter boxes and the sump pump (39 µg/L). These values are considered to be very low. Total phosphorus however was at a concentration level of 76 µg/L in the cistern compared to 216 µg/L and 91 µg/L in the filter boxes and the sump pump. Thus a reduction in total phosphorus was noted.

Fecal Coliform level was the lowest in the cistern at an average count of 60 cfu/100 mL but was as high as 896 cfu/100 mL in the sump pump sample. E. Coli was the lowest in the drainage basins with an average count of 2 cfu/100 mL with the cistern being the second lowest with a count of 37 cfu/100 mL. The sump pump sample contained the highest concentration of E. Coli with an average count of 121 cfu/100 mL.

The average concentration difference between the cistern and the other locations can be attributed to the cisterns larger volume. The average volume of water in drainage basins, filter boxes, and sump pump at the time of sampling were approximately 2 gallons, and the average volume of water in the cistern at the time of sampling was approximately 3000 gallons.

In summary, a first preferred embodiment of the invention provides a stormwater treatment system including a pond for storing a volume of stormwater and runoff stormwater, an in-situ treatment unit within the pond, the in-situ treatment unit having a sorption media therein, and a sump pump connected with the in-situ treatment unit for withdrawing the stored stormwater to gradually circulate the stored stormwater into the in-situ treatment unit to sorb nitrogen from the stored stormwater. The sorption media includes at least one of a tire crumb, sawdust, activated carbon, iron amended resins, orange peel, peat, leaf compost, naturally occurring sands, zeolites, coconut husks, polymers, and soy bean hulls. In an embodiment, the sorption media consists essentially of 50% sand, 30% tire crumb and 20% sawdust or consists essentially of 50% sand, 15% tire crumb, 25% sawdust and 10% limestone. The pond can be a retention pond with the in-situ treatment unit including an entrance pipe in the retention pond for carrying the stormwater drawn by the sump pump into a filter containing the sorption media for removing the nitrogen from the stored stormwater and a recirculation pipe for discharging the filtered stored stormwater to the retention pond. Alternatively, the pond can be a detention pond with the in-situ treatment unit including a riprap apron, a perforated riser located at the bottom of the riprap apron, and a goetextile media encased in a sorption media jacket around the perforated riser.

A second preferred embodiment provides a green roof stormwater treatment system for a building on a site including a protection layer installed on a roof of a structure for waterproofing and insulating the roof, a pollution control media layer on the protection layer for filtration and sorption of solids and dissolved materials found in stormwater, a growing media on top of the pollution control media for growing vegetation on the green roof and filtering the stormwater passing through the growing media, an irrigation system for extracting stored filtered stormwater and irrigating the vegetation, and a cistern to store the runoff stormwater between irrigation events and recycling runoff stormwater by irrigating the green roof with the stored stormwater to enhance hydrologic related factors including evapotranspiration, the filtering abilities of the plants and growing media, and the stormwater holding abilities of the plants and growing media, and to reduce the volume of stormwater runoff from leaving the site.

The irrigation system can include a sump pump connected with a filtration system for filtering surface runoff water and recycling the stored stormwater and the system can include a Bioswale to remove silt and pollution from the surface runoff water and/or a grade line drainage basin connected with the bioswale for further collecting surface runoff water.

While the invention has been described, disclosed, illustrated and shown in various terms of certain embodiments or modifications which it has presumed in practice, the scope of the invention is not intended to be, nor should it be deemed to be, limited thereby and such other modifications or embodiments as can be suggested by the teachings herein are particularly reserved especially as they fall within the breadth and scope of the claims here appended.

We claim:

1. A growing media mixture to grow vegetation in a stormwater filtration system consisting of:
   at least one of an expanded clay and a tire crumb combined with peat moss, perlite and vermiculite.

2. The mixture of claim 1 wherein the growing media mixture consists of 60% expanded clay, 15% peat moss, 15% perlite and 10% vermiculite.

3. The mixture of claim 1 wherein the growing media mixture consists of tire crumb from recycled tires, expanded clay, peat moss, perlite and vermiculite.

4. The mixture of claim 3 wherein the tire crumb mix consists of 40% tire crumb from recycled tires, 20% expanded clay, 15% peat moss, 15% perlite and 10% vermiculite.

5. A greenroof growing media mixture consisting of:
   at least one of a tire crumb and an expanded clay combined with peat moss, perlite and vermiculite layered above a pollution control media with a separation fabric therebetween to keep particles of the growing media mixture out of the pollution control media, vegetation grown in the greenroof growing media mixture increasing evapotranspiration and reducing a volume of stormwater runoff in a greenroof stormwater filtration system.

6. The greenroof growing media mixture of claim 5 consists of:
   expanded clay, peat moss, perlite and vermiculite.

7. The greenroof growing media mixture of claim 5 consists of:
   tire crumb, expanded clay, peat moss, perlite and vermiculite.

8. The greenroof growing media mixture of claim 7 consists of:
   40% tire crumb.

9. The greenroof growing media mixture of claim 8 consists of:
   20% expanded clay.

10. The greenroof growing media mixture of claim 9 consists of:
    15% peat moss.

11. The greenroof growing media mixture of claim 10 consists of:
    15% perlite and 10% vermiculite.

12. The greenroof growing media mixture of claim 5 consists of:
    expanded clay, peat moss, perlite and vermiculite.

13. The greenroof growing media mixture of claim 12 consists of:
    60% expanded clay.

* * * * *